United States Patent [19]

Carlson

[11] 4,436,986
[45] Mar. 13, 1984

[54] ELECTRIC BLANKET SAFETY CIRCUIT

[75] Inventor: Gordon S. Carlson, Northbrook, Ill.

[73] Assignee: Sunbeam Corporation, Oak Brook, Ill.

[21] Appl. No.: 324,196

[22] Filed: Nov. 23, 1981

[51] Int. Cl.³ .............................................. H05B 1/02
[52] U.S. Cl. ................................... 219/505; 219/212; 219/508; 361/56; 361/2
[58] Field of Search ............... 219/505, 212, 504, 508, 219/528, 545; 361/2, 42, 54, 56

[56] References Cited

U.S. PATENT DOCUMENTS

| | | | |
|---|---|---|---|
| 3,215,896 | 11/1965 | Shattuck et al. | 317/16 |
| 3,325,718 | 6/1967 | McNulty | 321/11 |
| 3,493,815 | 2/1970 | Hurtle | 317/16 |
| 3,600,634 | 8/1971 | Muench, Jr. | 317/16 |
| 3,628,093 | 12/1971 | Crowley | 317/18 A |
| 3,845,355 | 10/1974 | Lawson | 317/18 A |
| 3,878,434 | 4/1975 | Voorhoeve | 317/16 |
| 3,968,407 | 7/1976 | Wilson | 317/16 |
| 4,034,185 | 7/1977 | Crowley | 219/212 |
| 4,251,718 | 2/1981 | Cole | 219/505 |
| 4,277,673 | 7/1981 | Kelly | 219/528 |

FOREIGN PATENT DOCUMENTS 964817  7/1964  United Kingdom ............... 219/505

Primary Examiner—M. H. Paschall
Attorney, Agent, or Firm—Neil M. Rose; Clifford A. Dean; Robert J. Fox

[57] ABSTRACT

A safety circuit for deenergizing an electric blanket of the type utilizing a positive coefficient resistance material as the heating element positioned between a pair of spaced conductor wires. The circuit includes one or more gas tubes with parallel resistances connected across the conductor wires to sense voltage changes caused by open or short circuits and to conduct sufficiently high currents to blow a series connected fuse.

17 Claims, 9 Drawing Figures

ELECTRIC BLANKET SAFETY CIRCUIT

BACKGROUND OF THE INVENTION

The present invention relates to a safety circuit for use in connection with an electrically heated blanket or bed cover. More particularly, it relates to a circuit intended for use in a blanket of the type using a positive temperature coefficient material as the heating element. It is an improvement over the circuit disclosed and claimed in U.S. patent application Ser. No. 136,202, filed Apr. 1, 1980.

Electric blankets are typically formed with fabric shells which include passageways throughout the area of the blanket in which a tortuous low wattage heating element is threaded. The blanket must be provided with some means for sensing overheat conditions along the heating element within the blanket so that the current to the blanket can be shut off or reduced before damage or injury is caused by the overheat condition. The various means for sensing such overheat conditions have included discrete bimetallic thermostats positioned at spaced intervals along the blanket. In addition, continuous sensing wires have been used in conjunction with the heating element wire. The sensing wire responds to overheat conditions to operate a relay which opens the circuit to the main heating element.

More recently, there has been consideration of the use of positive temperature coefficient materials for the heating element so as to provide a blanket wire which would be self-limiting from a temperature standpoint in any areas in which an overheat condition occurred. The blanket wire consists of two spaced conductors which are enclosed by a positive temperature coefficient material comprising polyethylene with carbon black particles mixed therewith. The electrical current passes through the positive temperature coefficient material in passing from the one conductor to the other conductor and the PTC material acts as a heating element.

The formulation of the PTC material and the physical dimensions of its extrusion is selected so that the resistance, and, therefore, the heat dissipation per foot of length are reasonably constant at any given temperature. At low temperatures, the heat dissipation per foot will be greater than at normal room temperatures. When in an overheat or high temperature condition, the heat dissipation will be less than normal. The PTC material self limits to produce a given heat dissipation or wire temperature for every different ambient and insulation system. In this way, when a section of the heater is bunched up or abnormally restricted insofar as heat transfer is concerned (something on top of the blanket), the PTC wire reacts to the new environment and reduces its heat dissipation in that area, trying to keep its temperature reasonably constant. A suitable PTC heating wire for use in connection with the present invention is disclosed in the U.S. patent to Kelly, U.S. Pat. No. 4,277,673.

Under normal circumstances, the type of PTC blanket wire described above operates well and eliminates the necessity for either the discrete bimetallic thermostats within the blanket or the various types of distributed sensing wires paralleling the heater wires in the blanket. However, it has been ascertained that significant problems arise when a broken or open circuit occurs in connection with one of the two conductors in the PTC wire. In such an event, there occurs arcing or overheating at the specific areas in which the break occurred. It would be desirable, therefore, to provide some means in connection with a positive temperature coefficient heating wire blanket to interrupt the circuit to the blanket prior to there being a dangerous condition caused by the arcing of a broken conductor.

It is well-known in the electric blanket art to provide overheat protection means which include means to blow a fuse in the event of such an overheat condition. One such circuit is shown in the U.S. patent to Crowley, U.S. Pat. No. 3,628,093 in which a short circuit is created in connection with an overheat means and such short circuit is used to blow a protective fuse in the circuit. Another piece of prior art in which the safety circuit blows a fuse in connection with a malfunction in a blanket is the U.S. patent to Crowley, U.S. Pat. No. 4,034,185. The British Patent Specification No. 964,817, discloses several embodiments of an electric blanket having gas tubes connected across the heating elements to blow a fuse in the event of various types of shorts or opens in the blanket wire circuit. The blanket wire disclosed in the British Specification is broken into two separate heating elements and is quite different from the single positive temperature coefficient resistant heating element utilized with the present invention.

There are also many examples of protective circuits which include means for blowing the circuit fuse to protect the load in the event of an overvoltage condition. Examples of these patents are Muench, Jr. U.S. Pat. No. 3,600,634; Wilson U.S. Pat. No. 3,968,407; Voorhoeve U.S. Pat. No. 3,878,434; Hurtle U.S. Pat. No. 3,493,815 and Shattuck et al U.S. Pat. No. 3,215,896. Also of possible interest is the patent to McNulty U.S. Pat. No. 3,325,718 which senses a condition in a load and provides a circuit to overload and blow the circuit fuse to disconnect the load from the power supply. Also of interest relative to the specific circuitry used in such protective circuits is Lawson U.S. Pat. No. 3,845,355 which shows a photoresistor controlling an overload relay.

SUMMARY OF THE INVENTION

The instant invention provides an electric circuit for use with a positive temperature coefficient blanket which cuts off the power to the blanket whenever an open circuit has occurred in one of the conductors. The circuit has a characteristic which permits it to operate selectively on the overvoltage condition produced by the conductor breakage while not responding to the types of momentary overvoltage conditions which are frequently found in household electrical power supply. The circuit is connected to respond to a break in either one of the two conductors in the blanket wire to create an effective short circuit across the ends of the heating element thereby overloading the series fuse to open the circuit before any damage in the way of igniting the PTC material or the gas produced by arcing at the break is concerned.

The circuit of the present invention utilizes one or more gas tubes which sense the voltage changes produced by shorts or opens in the circuit and in their conducting modes function to short the power supply line through the fuse so as to blow the fuse and eliminate a potentially hazardous situation. The two gas tubes or the two portions of one gas tube are so arranged in circuit so that a voltage unbalance caused by the open circuit triggers one tube or portion of a tube which in turn creates a voltage condition which triggers the second tube or portion of a tube to create a low impedance path from the power supply through the fuse.

The fuse provided is a slow blow type so that during the normal high inrush current encountered in the PTC material when first energized, the fuse will now blow out even though the peak currents are two or three times the fuse rating. This initial current surge is caused by the fact that the PTC wire when cool has a very low resistance which rises quickly upon energization of the circuit. If, however, there is a shorted condition in the blanket wire, the fuse will quickly blow out and de-energize the circuit. The fuse was selected to give the best protection during operation at all normal ambient temperatures and cold wire energization.

It is, therefore, an object of the present invention to provide an improved electric blanket having a positive temperature coefficient heating element with a sensing circuit connected to the heating element to disable the circuit in the event of an open or a short circuit in either of the heater conductor wires.

It is a further object of the present invention to provide an improved safety circuit for use in connection with a positive temperature coefficient heating wire blanket in which voltage sensing means comprise gas tubes connected to the ends of the heating wire to respond to breaks or short circuits in the individual conductors of the heating wire to short out the heating element wire for a sufficient period of time to blow the circuit fuse.

It is another object of the present invention to provide one or more gas tubes connected in parallel with the positive temperature coefficient heating element of an electric blanket and having means connected across the individual conductors of the heating wire to trigger the gas tubes and blow the circuit fuse in the event of any short or open circuits in the heating wires.

Further objects and advantages will become apparent as the following description proceeds and the features of novelty which characterize the invention will be pointed out in the claims annexed to and forming a part of the specification.

DETAILED DESCRIPTION OF THE INVENTION

Figure 1:
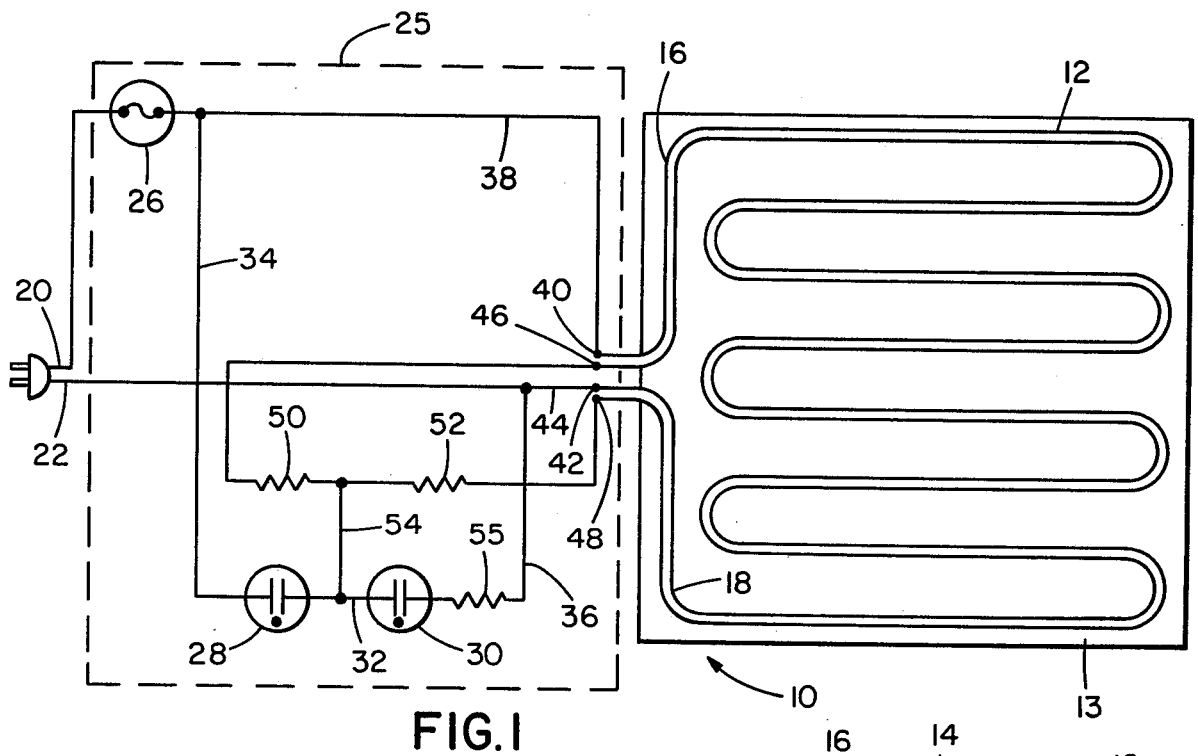
FIG. 1 is a schematic diagram of an electric blanket including a safety control circuit embodying my invention.
Figure 2:
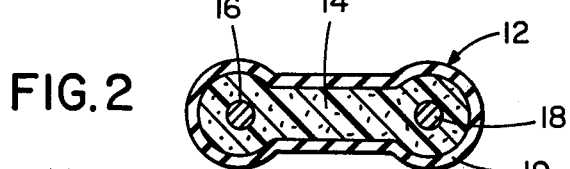
FIG. 2 is an enlarged sectional view of the positive temperature coefficient heating element wire which may be used in the electric blanket of FIG. 1.

Referring to FIG. 1 of the drawings, there is shown a schematic circuit diagram of a preferred embodiment of my invention wherein the electric blanket wire and the associated safety circuit are generally referred to by reference numeral 10. Included therein is an elongated blanket wire 12 which is typically on the order of 119 feet long for twin bed blankets and 162 feet long for double bed blankets and is looped back and forth through channels formed in an electric blanket shell 13 to provide heat evenly across the surface of the blanket in a well-known manner. The blanket wire 12 is of a type utilizing a positive temperature coefficient material 14 which is extruded between and around a pair of spaced conductors 16 and 18 as shown best in the sectional view of FIG. 2. Although the specific structure of the PTC heating wire or cable may vary considerably, one form of the wire is disclosed in detail in Crowley U.S. patent application Ser. No. 162,457, filed June 24, 1980, entitled FLEXIBLE SELF-LIMITING HEATING CABLE. The PTC material utilized in such wire is typically a polyethylene, silicone rubber or the like, having carbon black particles mixed therein in such a manner as to give the desired temperature/resistance characteristics. As indicated in the aforementioned Crowley application and the Kelly U.S. Pat. No. 4,277,673, the conductors are spaced apart and enveloped by the PTC material which is in good engagement with the conductors to assure a low resistance path therebetween. A suitable electrically insulating coating 19 is extruded over the PTC material.

Figure 3:
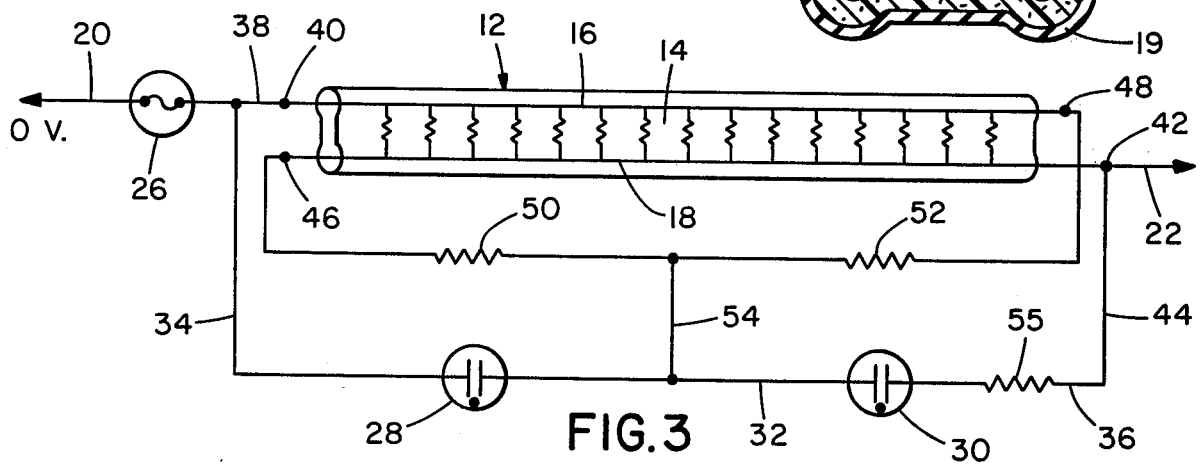
FIG. 3 is a further schematic diagram of the blanket of FIG. 1 showing the heating element wire schematically to illustrate the connection to the safety control circuit.

The conductors 16 and 18 are shown schematically in FIG. 3 as closely spaced with parallel resistances positioned between the conductors. There are actually no discrete resistances between the conductors 16 and 18 since the PTC material 14, which is positioned between the conductors 16 and 18 throughout the entire length, acts as a single continuous resistance heater as the current flows through the PTC material from one conductor to the other conductor. The conductors 16 and 18 have their opposite ends connected to a suitable source of electric power by means of leads 20 and 22, respectively. In order to have a uniform voltage drop between the conductors 16 and 18 at any point throughout the length of the blanket wire 12, the power leads 20 and 22 are connected to opposite ends of the blanket wire 12 as is best shown schematically in FIG. 3. With such an arrangement, the voltage drop between the adjacent conductors 16 and 18 at any point is essentially equal to the line voltage less the voltage drop resulting from the current passing through one length of either the conductor 16 or 18. As an example, at the end of conductor 16, adjacent the power lead 20, the voltage would equal the line voltage less the drop caused by the current passing through the length of conductor 18. Similarly, at the end of conductor 18, adjacent the power lead 22, the voltage drop between the conductors 16 and 18 would equal the line voltage less the voltage drop caused from the current passing through the length of the conductor 16. Similarly, at the middle of the blanket wire 12, the drop across the conductors 16 and 18 would equal the line voltage less the voltage drop caused by the current passing through half of the conductor 16 and half of the conductor 18 This arrangement results in a uniform heating effect being obtained throughout the length of the blanket wire 12. It should be understood, however, that the above described connection of the power leads to the opposite ends of the blanket wire 12, to the non-adjacent ends of conductors 16 and 18, is simply a preferred connection and that the circuit hereinafter described could be utilized in a combination in which the power is connected to adjacent ends of the conductors 16 and 18. This arrangement would result in less uniform heat being produced by the blanket wire 12 since the voltage drop across the conductors 16 and 18 would vary throughout the length of the wire.

Electric blankets are conventionally used in much the same manner as a nonelectric blanket being spread across a bed and overlying the user. During use and between uses, the blanket may be flexed or folded repeatedly. In addition, when stored or when washed, the electric blanket is again subjected to repeated folding and flexing. In view of the demands made on an electric blanket in normal use, it is necessary that the blanket wire 12, including the associated conductors 16 and 18, the PTC material 14 and the coating 19, be made of suitable dimensions and materials so that they can be repeatedly flexed without breaking or causing any other problems. In spite of careful design and manufacture of the blanket wire, there will be occasions in which a break or fault will develop in the conductors 16 and 18. When such a break or fault occurs and the blanket is connected to a source of electrical power, an electrical arc will often occur at the break. This arc will often cause burning of the PTC material.

In order to prevent or eliminate problems of this type, the electric blanket of the instant invention is provided with a safety circuit designated generally by reference numeral 25 and shown in FIG. 1 enclosed in dotted lines. The safety circuit includes a fuse 26 which is connected in series with the power lead 20 to interrupt the circuit when the current to the blanket exceeds a predetermined minimum for more than a preselected period of time. In a preferred embodiment, the fuse 26 was a slow blow fuse rated at 2 amperes which specifies that it would open the circuit after the current equalled 210 percent of its rating. Such a fuse would not blow with a 4 ampere current but would blow in about 30 seconds with a 5 ampere current. It is also important that the fuse be capable of withstanding current surges in excess of the aforementioned 5 ampere current, in order that it may withstand the initial surge of current resulting from the low cold resistance of the PTC material and voltage surges that may activate the safety circuit 25 for periods of one half of a cycle or for 8.3 milliseconds. The circuit 25 includes a pair of serially connected gas tubes 28 and 30 which are connected together by lead 32 and which are connected by leads 34 and 36 to opposite sides of the power line or to leads 20 and 22, respectively. As far as the lead 34 is concerned, it is connected in series with the fuse 26 to the power lead 20. The lead connecting the junction of the lead 34 and the fuse 26 to conductor 16 of the blanket wire 12 is designated by reference numeral 38 which is connected with what will be termed the input or power terminal 40 of the blanket wire 12. The other power terminal 42 is connected to the junction of the power lead 22 and the lead 36 by lead 44. It will be noted that the power terminals 40 and 42 on the blanket wire 12 are at opposite ends of the blanket wire 12; one being on the conductor 16 and one on the conductor 18.

A pair of sensing terminals designated as 46 and 48 are disposed on the opposite ends of the conductors 18 and 16 from the power terminals 40 and 42, respectively. Connected across the sensing terminals 46 and 48 of the blanket wire 12 are serially connected resistances 50 and 52. In a preferred embodiment of the invention, resistances 50 and 52 were selected to be on the order of 33K ohms, thereby providing a substantial impedance to the current flow between conductors 16 and 18. The junction of the resistances 50 and 52 is connected to the lead 32 between the gas tubes 28 and 30 by a lead 54.

In order to limit the current when both tubes 28 and 30 are in their conducting and arcing mode across the power source, a resistance 55 is connected in series with lead 36. This resistance may be on the order of 25 ohms in order to achieve the desired response in the blowing of the fuse when the circuit is operated at 240 volts. In the constructed embodiment, the fuse was designed to blow in 20 to 80 milliseconds with the circuit drawing a current of 8 amperes.

The gas tubes 28 and 30 are designed to breakdown at some voltage which is greater than one-half the line voltage from which the blanket 10 is intended to be energized. There are commercially available gas tubes, from Xenell Corporation of Wynnewood, Okla., containing mixtures of helium, neon, argon and krypton 85 which have breakdown and maintaining voltages which are suitable for use in the circuit of my invention. In addition, the tubes in their arcing mode are capable of drawing high currents and providing very low voltage drops, being suitable to perform switching functions in response to voltage changes. A gas tube of this type characteristically includes a first voltage at which the tube begins to conduct. This voltage is known as the breakdown voltage. Once conduction has begun, the tube will continue to conduct as long as a maintaining voltage exists across the electrodes. While the breakdown voltage may be varied considerably by altering the mixture of gases contained in the tube, as is well-known in the art, it is not practical to design a gas tube which would have a breakdown voltage of less than 65–70 volts; such a tube would also have a lower limit for its maintaining voltage of about 60 volts. It is for this reason that the circuit of FIGS. 1 and 3 has some limitation when used on voltages on the order of 120 volts while providing more universal sensing when used in circuits designed for use at 240 volts.

Figure 7:
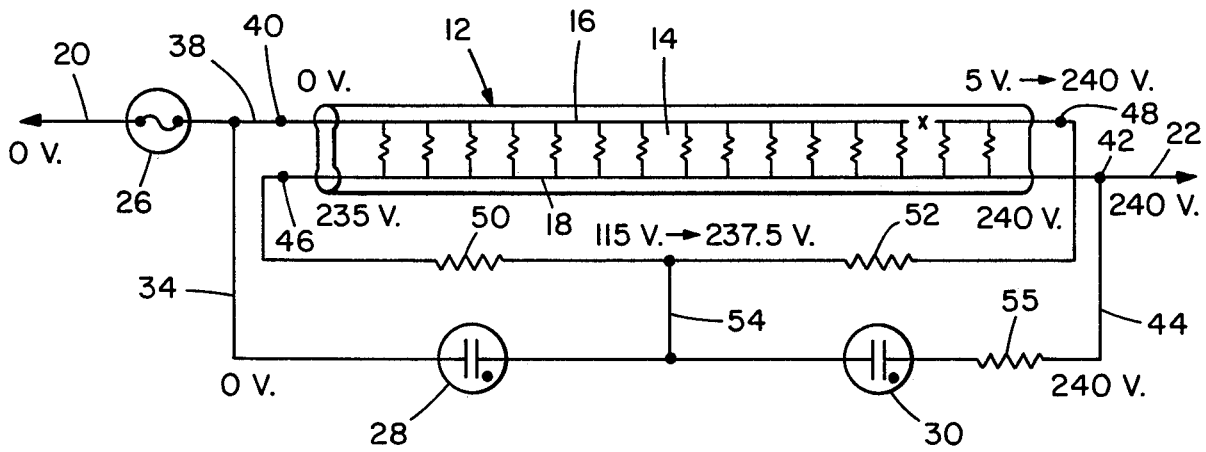
FIGS. 7 and 8 are schematic diagrams of the same circuit as is shown in FIG. 3, but showing the relative voltage drops when energized by 240 volts under conditions of an open circuit and a short circuit.

To understand the manner in which the circuit of FIGS. 1 and 3 operates under conditions of a break in one of the conductors 16 or 18, reference should be made to FIG. 7 of the drawings wherein the circuit is reproduced in similar fashion to FIG. 3 but the voltages existing at various points in the circuit are shown. The voltages assume energization at 240 volts AC and are those which exist when the 0 voltage and 240 voltage exist at the power terminals 40 and 42, as shown. Each of the conductors 16 and 18 has a resistance of about 30 ohms and the blanket wire 12, under normal conditions, would draw approximately 0.25 amps. Under normal conditions, the voltage at the sensing terminals 46 and 48 would be 235 and 5 volts, respectively. If we assume that an open circuit occurs in the conductor 16, the voltage at sensing terminal 48, which is now isolated from the remainder of the conductor 16, will assume the same voltage as the power terminal 42, or 240 volts. This will result in a voltage at the interconnection between the gas tubes 28 and 30 changing from 115 volts to, on the order of, 237½ volts. As a consequence, breakdown will occur in the gas tube 28. When such breakdown occurs, the voltage at the junction between the tubes 28 and 30, will fall to the maintaining voltage for tube 28 producing a differential voltage across tube 30 sufficient to cause breakdown therein. When both tubes 28 and 30 are conducting at the same time, the current will be limited principally by the series resistance which will in turn permit sufficient current to blow the fuse 26.

Figure 8:
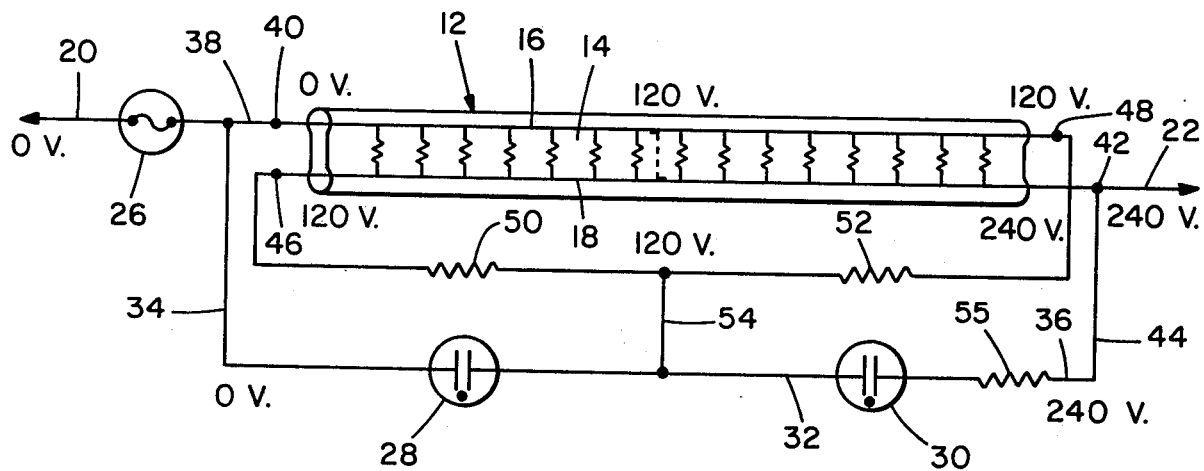

Turning now to the schematic diagram of FIG. 8, we will consider the operation of the circuit of FIGS. 1 and 3 under conditions of a short circuit. A short circuit at other than the midpoint of the blanket wire 12, will produce an unbalanced voltage which will be sufficient to cause breakdown of one of the tubes 28 and 30 and thereafter, the other tube will be caused to breakdown. Under normal circumstances, a short circuit will probably occur at the ends of the blanket wire 12, where it is adjacent the terminal connections. When a short circuit occurs in the blanket wire 12 adjacent the terminals 40, 42 and 46, 48, the power terminal will effectively be shorted to the adjacent sensing terminal causing the two sensing terminals to then be either at essentially 240 or 0 volts. Such a condition will cause one of the gas tubes 28 or 30 to breakdown and then the other. In a situation where the short occurs at the middle of the blanket wire 12, there will be a 120 volt signal appearing at sensing terminal 48 and a 120 volt signal appearing at sensing terminal 46. As a consequence, the common connection between the tubes 28 and 30 would be a 120 volt and no breakdown would occur. However, as soon as the point of the break is displaced more than 15% or so from the center of the blanket wire 12, the voltage at the sensing terminals would exceed the 140 volt breakdown or be less than 100 volts to cause breakdown in the tube 30. Because of the fact that the center short condition is relatively unlikely, there will be many applications in which the circuit of FIGS. 1 and 3 will be acceptable since it will function to blow the fuse 26 in all conditions in which there is an open in the conductors 16 and 18 and in most conditions in which there is a short between the conductors 16 and 18.

With respect to the above described situation in which the circuit 25 would be ineffective in causing the fuse 26 to blow, it should be understood that whenever there is a short circuit, the problems presented and the solutions required are quite different than in the case of an open circuit. In the open circuit situation, the arcing at the break in the conductor 16 or 18 tends to create a hazardous situation very quickly and the current drawn by the blanket wire 12 is reduced so there is no tendency for the fuse 26 to blow except through the use of circuit means external to the blanket wire 12. However, in the case of a short circuit, the results are quite different. The entire blanket wire 12 tends to draw a higher current which is limited only by the resistance of the then effective portions of the conductors 16 and 18. In the case of the above described embodiment operating at 240 volts, the resistance would be about 32 ohms which would limit the current through the blanket wire 12 to approximately 8 amps. Such a current would begin to heat up the blanket wire 12 above its desired temperature levels but prior to reaching the temperature limits of the insulation on the blanket wire 12, or the temperature limits of the adjacent blanket material, the 8 ampere current through the fuse 26 would by itself cause the fuse 26 to blow without any reliance on the safety circuit 25. This blowing of the fuse 26 might not occur for in excess of 10 or 20 seconds, but no damage would have occurred in this length of time. Thus, the failure of the safety circuit 25 to respond to a centrally located short is of no serious consequence since the quick response required of the circuit 25 is only in connection with the open circuit conditions which tend to produce dangerous arcing conditions.

Nevertheless, the later described embodiments, utilizing the three element gas tubes, have some advantages over the embodiment of FIGS. 1 and 3 since the safety circuits shown therein are sensitive to all types of short circuits as well as open circuits. In these circuits utilizing three element gas tubes, more flexibility is achieved since once a breakdown has been produced in a three element tube, that breakdown permits conduction between all three elements of the tube and not just the two elements which have the voltage differential to cause such breakdown.

Figure 4:
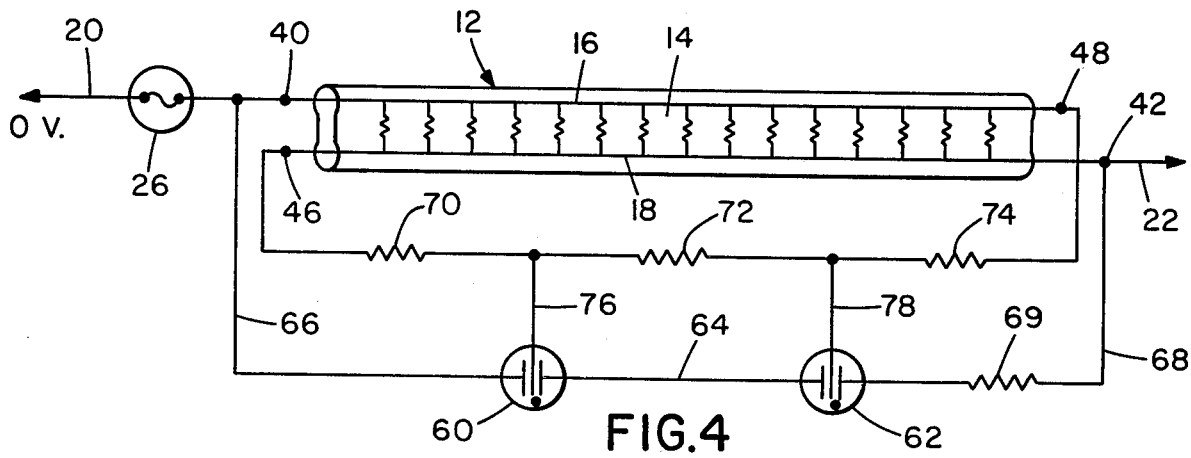
FIG. 4 is a schematic diagram of an alternative circuit embodying my invention.

Turning now to the embodiment of FIG. 4, there is shown the same schematic illustration of the blanket wire 12 with its conductors 16 and 18 spaced by the PTC material 14. The heating element includes the power terminals 40 and 42 as well as the sensing terminals 46 and 48. Connected in series across the power terminals 40 and 42 is a pair of three element gas tubes or trigger tubes 60 and 62. Two of the outer elements of the trigger tubes 60 and 62 are connected together by a lead 64 while the other outer elements of the gas tubes 60 and 62 are connected by leads 66 and 68 to the power terminals 40 and 42 of the blanket wire 12. As in the embodiment of FIGS. 1 and 3, there is provided a current limiting resistance 69 in the lead 68 to limit the current through tubes 60 and 62 when both have broken down and are operating in the arc mode.

The sensing terminals 46 and 48 of the blanket wire 12 are connected to three series connected resistances 70, 72 and 74, the resistances 70 and 74 being 33K ohms while the resistance 72 is 66K ohms. As shown in FIG. 4, a lead 76 interconnects the junction of resistances 70 and 72 with the centermost element of the trigger tube 60, whereas lead 78 interconnects the center element of the trigger tube 62 to the junction of the resistances 72 and 74. The trigger tubes 60 and 62 are designed to breakdown at a voltage of between 80 and 95 volts for use with 240 volt AC power.

In order to understand the operation of the circuit of FIG. 4, we shall consider it as energized from a 240 volt, 60-cycle source. Under conditions when lead 20 is at 0 volts and the lead 22 is at 240 volts, the voltages at the sensing terminals 46 and 48 of the blanket wire 12 would be 10 and 230 volts, respectively, giving a total voltage drop across the divider comprising the resistances 70, 72 and 74, of 220 volts, and the voltages at the junction points or leads 76 and 78 would be 60 and 180 volts, respectively. Thus, considering the voltages of the various elements of the gas tubes 60 and 62, going from left to right, the voltage levels would be 0 volts, 60 volts, 120 volts, 120 volts, 180 volts and 240 volts.

If an open circuit occurred in either of the conductors 16 or 18, the sensing end of that conductor would then assume the voltage of the other sensing terminal as a consequence of the connection through the resistances 70, 72 and 74. In such an instance, the voltage on the connectors 76 or 78 would either fall sufficiently or rise sufficiently to cause conduction in the gas tubes 60 and 62. If we assume an open circuit in conductor 16, the voltage at the sensing terminal 48 which had been 20 would then correspond with the voltage at the sensing terminal 46, which is 230 volts. With 230 volts at both ends of the series resistances 70, 72 and 74, there would be 230 volts on lead 76, resulting in tube 60 becoming conducting and dropping the voltage at lead 64 so tube 62 would also become conducting. At that time, both tubes 60 and 62 would conduct in the arc mode drawing sufficient current limited only by the resistance 69 and thereby blowing the fuse 26. It may be shown that such condition would occur under any conditions of open circuit or short circuits throughout the length of the blanket wire 12 when operated on 240 volts.

The most difficult type of short to detect would be one occurring exactly halfway between the ends of the blanket wire 12. In such a situation, the voltage at the short would be 120 volts which voltage would also be found at both of the sensing terminals 46 and 48 and the interconnecting series resistances. With 120 volts at leads 76 and 78, the tubes 60 and 62 would conduct causing increased current flow through the fuse 26 which would blow the fuse.

The advantage of the trigger tubes 60 and 62 is that as soon as breakdown voltage is attained between either of the two adjacent elements, there is ionization of the tube and conduction takes place between all three of the electrodes. Once one of the trigger tubes 60 or 62 conducts, the voltage of the connecting lead 64 will immediately change sufficiently to cause the other tube to conduct.

Figure 5:
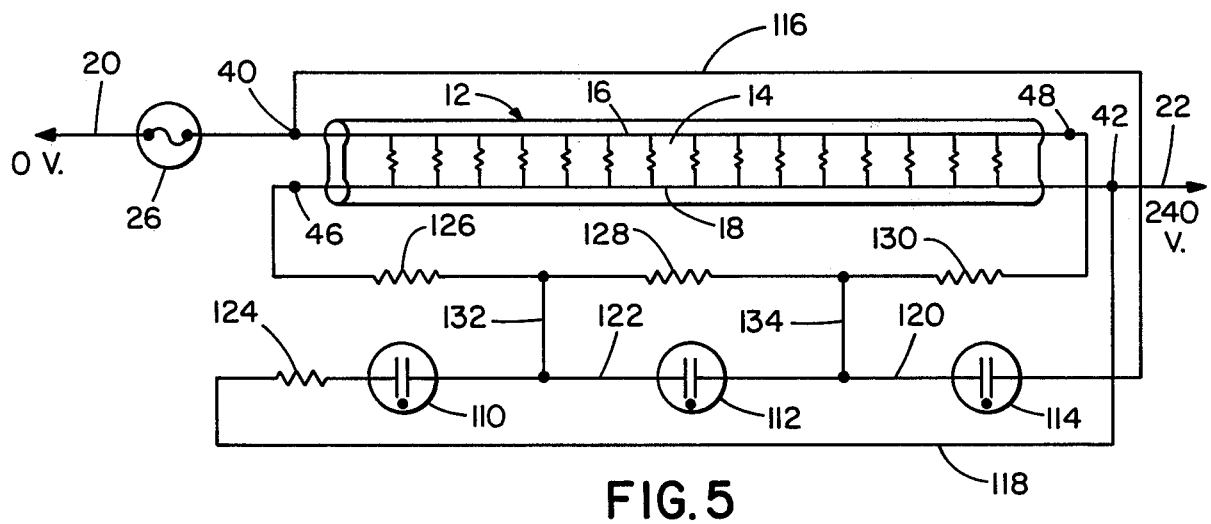
FIG. 5 is a schematic diagram of an alternative embodiment of my invention which utilizes 3 two element gas tubes.

Disclosed in FIG. 5 is another embodiment of the invention which utilizes two element gas tubes as does the embodiment of FIG. 1, but which has the advantage of being responsive or sensitive to short circuits even in the event that they occur in the middle of the blanket wire 12. The blanket wire 12 and its associated conductors 16 and 18, the power terminals 40, 42 and the sensing terminals 46, 48 and the power leads 20 and 22 are all shown in the same manner in FIG. 5 as in the earlier described embodiments. In addition, the blanket wire 12 includes the positive temperature coefficient resistance material 14 positioned between the conductors 16 and 18. The sensing circuit in the embodiment of FIG. 5 includes gas diodes 110, 112 and 114 connected in series across the power terminals 40, 42 by leads 116 and 118, respectively. The lead 116 connects to one element of tube 114 and the other element of tube 114 is connected by lead 120 to one of the elements of the tube 112. The other element of the tube 112 is connected by lead 122 to one of the elements of the tube 110. The other element of the tube 110 is connected through current limiting resistor 124 to the lead 118.

Connected across the sensing terminals 46 and 48, is a resistance network comprising series connected resistances 126, 128 and 130. In a preferred embodiment in which the blanket wire 12 is adapted to be energized from a 240 volt alternating current power supply, the resistances 126, 128 and 130 were selected as 30,000 ohms, 60,000 ohms and 30,000 ohms, respectively. Leads 132 and 134 are provided to interconnect the junction of the resistances 126, 128 and 130 to the leads 122 and 120, respectively. The gas diodes 110, 112 and 114 are selected to have a breakdown voltage of 100 volts and a maintaining voltage of 60 volts. To understand how the circuit would operate, we might consider the example in which there is a short circuit between the conductors 16 and 18 halfway between the ends of the respective conductors. In such a situation, the voltage at the midpoint where the short occurs would be 120 volts when the terminal 40 is 0 and the terminal 42 is 240 volts. With the middle of conductor 18 being at 120 volts, the sensing terminal 46 would be 120 volts and the sensing terminal 48 at the end of the conductor 16 would also be 120 volts. With 120 volts at either end of the resistance network, the voltage at the leads 132, 122 and 134, 120 would also be 120 volts.

If we then consider the voltage existing across the tube 110, we note that the left-hand terminal, as viewed in FIG. 5, would be essentially at 240 volts while the right-hand terminal would be at 120 volts, thereby resulting in breakdown since the breakdown voltage for gas tube 110 is 100 volts. Similarly, the voltage condition across tube 114 would be 0 volts on the right-hand terminal which is connected by lead 116 to the power terminal 40 and on the left-hand terminal there would again be 120 volts resulting in breakdown across the gas tube 114. The breakdown across tubes 110 and 114 would result in lowering the voltage on the right-hand terminal of tube 112 and raising the voltage on the left-hand terminal of tube 112 since there would be approximately a 60 volt drop across each of the tubes 110 and 114 in their conducting states. As a consequence, the voltage of the left-hand terminal of tube 112 would be 180 volts and 60 at the right-hand terminal. The differential would be 120 volts or in excess of the breakdown voltage. With all three of the tubes 110, 112 and 114 conducting, the tubes would be in their arcing mode with the current being limited basically by the resistance 124 which in the described embodiment is a 25 ohm, 5 watt resistance. Under the described conditions, the current flow through the fuse 26 would be sufficient to blow the fuse within 20 to 80 milliseconds. The primary advantage of the embodiment of FIG. 5 is the fact that it permits the use of the less expensive and less critical two element gas tubes as compared to the three element tubes used in some of the other embodiments. The above described condition of the center short is basically the most difficult condition to sense. An analysis of the circuit under conditions of open circuits any place over the length of the conductors 16 or 18 or shorts through the length of the blanket wire 12 shows that either of these conditions would cause the gas tubes 110, 112 and 114 to conduct in their arcing state to blow the fuse 26 in a short period of time.

Figure 6:
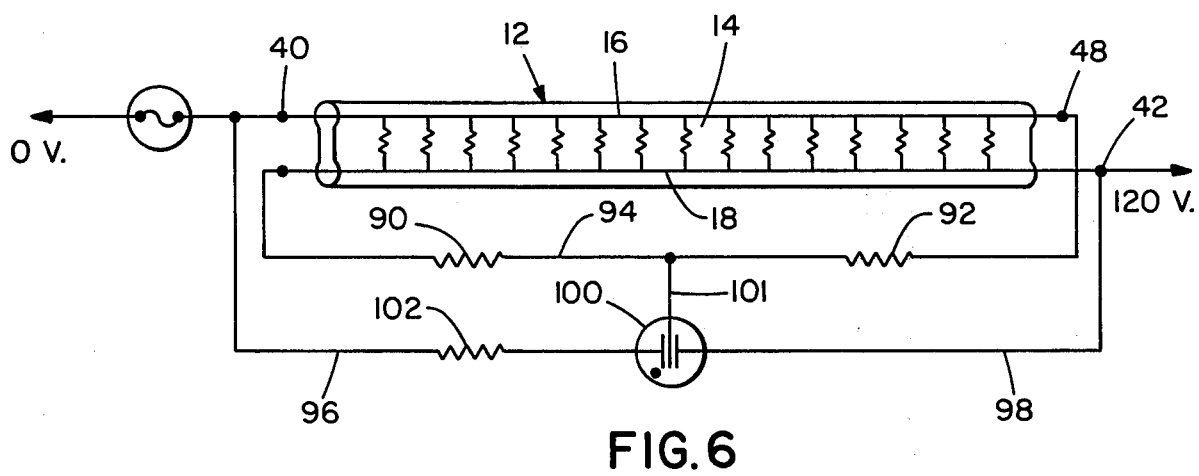
FIG. 6 is a schematic diagram of an alternative embodiment of my invention which includes a single three element gas tube in the sensing circuit.

Referring now to FIG. 6, there is shown a preferred embodiment which utilizes only a single three element gas tube. For the purposes of explanation, the blanket wire 12 with its conductors 16 and 18 separated by the PTC material 14 are shown in the same manner as in the earlier described embodiments. In addition, the blanket wire 12 is provided with the power terminals 40 and 42 and the sensing terminals 46 and 48. The high impedance circuit connected across the sensing terminals 46 and 48 comprises the series connected resistances 90 and 92 which have a common lead 94 interconnecting them. Connected across the power terminals 40 and 42 by leads 96 and 98 is a three element gas tube 100. The tube 100 may be termed a triode glow discharge tube or a trigger tube, but in any event, includes three equally spaced elements between which the glow discharge within the tube occurs. One of the outside elements of the tube 100 is connected to the lead 96 through a current limiting resistance 102 which may be on the order of 5 to 7½ ohms. The other outside element of the tube 100 is connected by the lead 98 to the other power terminal 42. The center element of the tube 100 is connected to the lead 94 or the junction between the two resistances 90 and 92 by a lead 101. The tube 100 is designed to breakdown when subjected to 80 volts RMS across either of the two pairs of adjacent elements.

Under normal conditions, when the blanket wire 12 is energized at 120 volts AC, the voltage at the sensing terminals 46 and 48 would be 90 and 30 volts, respectively. This would produce a voltage of 60 volts at the middle of the voltage divider formed by the resistances 90 and 92. Accordingly, the voltage existing on the elements of the triode 100 would be 0, 60 and 120. In the event of an open circuit in either of the conductors 16 or 18, the sensing terminal of that conductor would then assume the voltage of the adjacent power terminal. In other words, if the break were in the conductor 16, the sensing terminal 48 would assume a voltage of 120 volts which in turn would produce a voltage of 105 volts on the center electrode of the gas tube 100. This voltage would be equal to the breakdown voltage causing conduction in the tube 100. As soon as conduction was initiated, it would continue across the outer electrodes and would enter the arcing condition with the current being limited only by the resistance 102.

Although the circuit of FIG. 6 would be insensitive to shorts produced at the middle of the blanket wire 12, it would readily respond to any shorts that were displaced in either direction from the middle by an amount equal to 15% of the length of the blanket wire 12. With such displacement, the voltage differential on the sensing terminals would produce either a low enough or high enough voltage on the center electrode of the tube 100 to achieve the 80 volt breakdown voltage. As indicated earlier, the normal flexing of the blanket wire 12 is most pronounced adjacent the ends or terminal portions so that any shorts would normally occur well away from the middle of the blanket wire 12 and, therefore, would be easily sensed by the circuit of FIG. 6.

As explained above in connection with the embodiments of FIGS. 1 and 3, the short circuit located in the middle of the blanket wire 12 would still blow the fuse 26 even though the safety circuit would be insensitive to a short of this type. The fuse 26, in the embodiment of FIG. 6, would be rated at 1.6 amps. In a short situation, the blanket wire 12 would draw about 4 amps, causing the fuse 26 to blow within 30 seconds. Also, as mentioned above, the response time required in blowing the fuse 26 in a short circuit situation is much less than with respect to the open circuit condition.

Figure 9:
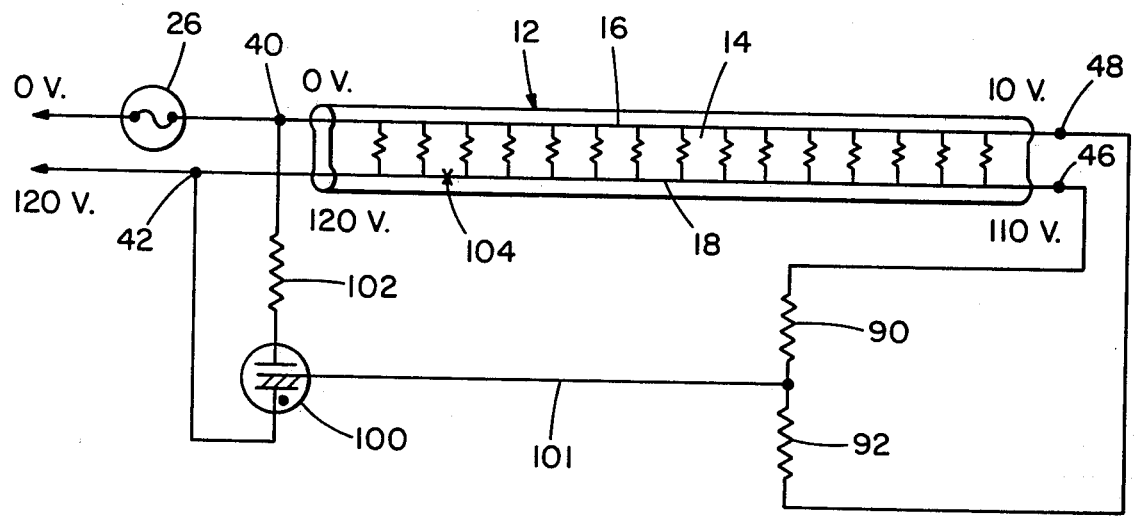
FIG. 9 is a schematic diagram of an alternative embodiment of my invention which is similar to the embodiment of FIG. 6, but which has the power supply connected in one end of the blanket wire only.

All of the various described embodiments of the invention may be applied to positive temperature coefficient heating wire circuits in which the blanket wire 12 is energized from one end. To merely illustrate such an arrangement, there is shown in FIG. 9 a circuit which is identical to FIG. 6 except for the manner in which the blanket wire 12 is connected to the power supply. Identical reference numerals have been used in FIG. 9 as compared to FIG. 6 to illustrate the identity of the safety circuit shown therein. The open circuit condition at the point designated 104 in the conductor 18 results in a change in the voltage conditions across the center terminal and one of the outer terminals such that breakdown occurs in the tube in the same manner as was described in connection with the embodiment of FIG. 6. With the voltage applied as shown, the voltage at terminal 46 would drop from 110 volts to 10 volts causing the voltage at the center terminal of tube 100 to become 10 volts, resulting in breakdown. The only read difference between the two embodiments is the fact that the heating throughout the length of the blanket wire 12 is not as uniform in FIG. 9 since the voltage drop between the conductors 16 and 18 varies throughout the length of the blanket wire 12.

In all of the various embodiments and in the discussion of them, reference has been made to the fuse 26 which is responsive to the current increase to open the circuit in the event of short circuits or open circuits. It should be appreciated that the fuse 26 may be replaced by any other current responsive element which would serve to open the circuit in the event of current increases caused by the functioning of the safety circuit 25. While several embodiments of the present invention have been shown, it will be understood that various changes and modifications will occur to those skilled in the art, and it is contemplated in the appended claims to cover all such changes and modifications as fall within the true spirit and scope of the present invention.

What is claimed as new and desired to be secured by Letters Patent of the United States is:

1. In an electrical circuit, the combination comprising a heating cable including a pair of spaced conductors separated throughout their lengths by a layer of positive temperature coefficient resistance material, each of said conductors having a power supply end and a sensing end, a power supply cord connected to said cable at said power supply ends of said conductors to connect said cable to an alternating current power supply, a current responsive switching means in series with one of said conductors, a sensing means connected to said sensing ends of said conductors, said sensing means including a pair of series connected impedance elements, a pair of gas tube elements connected in series between said power supply ends of said conductors, the junction of said impedance elements and the gas tube elements being connected together, said gas tube elements being nonconducting under normal operating conditions and conducting when shorts or open circuit conditions occur in said conductors, said gas tube elements having sufficient current capacity in the conducting state to activate said switching means in series with said cable.

2. The circuit of claim 1 wherein said gas tube elements comprise a three element gas tube having three equally spaced electrodes with two outer electrodes and a center electrode, the center electrode being connected to the junction of said impedances and the outer electrodes connected to said power supply ends of said conductors.

3. The circuit of claim 1 wherein said gas tube elements comprise a pair of diodes each having a breakdown voltage of slightly greater than one-half of the energizing voltage of the power supply.

4. The combination of claim 1 wherein said gas tube elements comprise a pair of three element gas tubes connected in series across said power supply ends of said conductors, said three element tubes each having a center element and two outer elements equally spaced on opposite sides of said center element, said pair of impedances being part of a series network of three resistances connected across said sensing ends of said conductors, the center element of each said gas tube being connected to one of the junctions of two of said resistances in said network, one of said outer electrodes of each gas tube connected to a power supply end of one of said conductors and the other of said outer electrodes being connected together.

5. In a circuit for an electric blanket, the combination comprising a heating cable including a pair of spaced conductors separated throughout their lengths by a layer of positive temperature coefficient resistance material, each of said conductors having a power supply end and a sensing end, said power supply end of each of said conductors being adjacent the sensing end of said other conductor, a power supply cord connected to said cable at said power supply ends of said conductors to connect said cable to an alternating current power supply, a fuse in series with one of said conductors, a sensing means connected to said sensing ends of said conductors, said sensing means including a pair of series connected impedance elements, a pair of gas tube elements connected in series across said power supply ends, the junction of said impedance elements and the gas tube elements being connected together, said gas tube elements being nonconducting under normal operating conditions and conducting when shorts or open circuit conditions occur in said conductors, said gas tube elements having sufficient current capacity in the conducting state to activate said fuse in series with said cable.

6. The circuit of claim 5 wherein said gas tube elements comprise a three element gas tube having three equally spaced electrodes with two outer electrodes and a center electrode, the center electrode being connected to the junction of said impedances and the outer electrodes connected to said power supply ends of said conductors.

7. The circuit of claim 5 wherein said gas tube elements comprise a pair of diodes each having a breakdown voltage of slightly greater than one-half of the energizing voltage of the power supply.

8. The combination of claim 5 wherein said gas tube elements comprise a pair of three element gas tubes connected in series across said power supply ends of said conductors, said three element tubes each having a center element and two outer elements equally spaced on opposite sides of said center element, said pair of impedances being part of a series network of three resistances connected across said sensing ends of said conductors, the center element of each said gas tube being connected to one of the junctions of two of said resistances in said network, one of said outer electrodes of each gas tube connected to a power supply end of one of said conductors and the other of said outer electrodes being connected together.

9. In a circuit for use with a heating cable, the combination comprising a heating cable including a pair of spaced conductors separated throughout their lengths by a layer of positive temperature coefficient resistance material, each of said conductors having a power supply end and a sensing end, a fuse in series with one of said conductors, a sensing means connected to said sensing ends of said conductors, a three element gas tube having three equally spaced electrodes with two outer electrodes and a center electrode, the center electrode being connected through impedance means to each of said sensing ends of said conductors and the outer electrodes connected to said power supply ends of said conductors, said gas tube being nonconducting under normal operating conditions and conducting when shorts or open circuit conditions occur in said conductors, said gas tube elements having sufficient current capacity in the conducting state to activate said fuse in series with said cable.

10. In a circuit for an electric blanket, the combination comprising a heating cable including a pair of spaced conductors separated throughout their length by a layer of positive temperature coefficient resistance material, each of said conductors having a power supply end and a sensing end, said power supply end of each of said conductors being adjacent the sensing end of said other conductor, a power supply cord connected to said cable at said power supply ends of said conductors, a fuse in series with one of said conductors, a sensing means connected to said sensing ends of said conductors, said sensing means including a pair of impedances connected in series across said sensing ends of said conductors, a three element gas tube having three equally spaced electrodes with two outer electrodes and a center electrode, the center electrode being connected to the junction of said impedances and the outer electrodes connected to said power supply ends of said conductors, said gas tube being nonconducting under normal operating conditions and conducting when shorts or open circuit conditions occur in said conductors, said gas tube elements having sufficient current capacity in the conducting state to activate said fuse in series with said cable.

11. The combination of claims 9 or 10 wherein said gas tube has a breakdown voltage between said outer electrodes substantially greater than the power supply voltage and the breakdown voltage between said center electrode and either of said outer electrodes being more than one-half of the supply voltage.

12. The combination of claims 9 or 10 including a current limiting resistance in series with said gas tube across said power supply ends.

13. The combination comprising an elongated flexible wire heating element having a pair of spaced conductors extending the length of said element, a positive temperature coefficient resistance material positioned between said conductors to function as a self-limiting heater when said conductors are connected to a source of electrical power, a sheath of electrically insulating material enclosing said conductors and said resistance material, circuit means connected to the ends of said conductors to sense an open circuit in said conductors, said circuit means including a voltage sensitive element connected across each of said conductors, a fuse connected in series with one of said conductors, said voltage sensitive element sensing an increase in voltage caused by a break in the respective conductor it is connected across, said voltage sensitive element including a multiple element gas tube connected across said conductors, said circuit means including impedance means connected in parallel with said gas tube and to the ends of said conductors to produce an unbalance in voltage in the event of an open circuit to cause breakdown in said gas tube.

14. In a circuit for an electric blanket, the combination comprising a heating cable including a pair of spaced conductors separated throughout their length by a layer of positive temperature coefficient resistance material, each of said conductors having a power supply end and a sensing end, said power supply end of each of said conductors being adjacent the sensing end of said other conductor, a power supply cord connected to said cable at said power supply ends of said conductors to connect said cable to an alternating current power supply, a fuse in series with one of said conductors, a sensing means connected to said sensing ends of said conductors, said sensing means including a pair of series connected impedance elements, a pair of gas tube elements connected in series across said power supply ends, the junction of said impedance elements and the gas tube elements being connected together, each of said gas tube elements having a breakdown voltage equal to substantially greater than one-half of the power supply voltage, short circuits between said conductors or open circuits in said conductors changing the voltages at said sensing terminals to cause conduction in both of said gas tube elements to cause sufficient current flow to blow said fuse.

15. An improved electric blanket comprising a heating cable including a pair of spaced conductors separated throughout their length by a layer of positive temperature coefficient resistance material, said positive temperature coefficient resistance material being of high impedance as compared to said conductors so that said material forms a self-limiting heater when said cable is connected to a source of electrical power, each of said conductors having a power supply end and a sensing end, said power supply end of each of said conductors being positioned adjacent the sensing end of the other conductor to provide a constant voltage drop between said conductors when energized by an alternating current power supply by means of a power supply cord connected to said power supply ends of said conductors, a fuse in series with one of said conductors, an impedance connected between said sensing ends of said conductors, said impedance being sufficiently high as to have a negligible effect on the voltages present on said sensing ends of said conductors under normal operating conditions, switching means connected between said power supply ends of said conductors to blow said fuse under conditions of open circuit in either of said conductors or shorts between said conductors, said open circuit or short conditions changing the voltages at said sensing ends of said conductors, said switching means being responsive to said voltage changes to lower the impedance of said switching means to blow said fuse.

16. The combination of claim 15 wherein said impedance means comprises a plurality of resistances and said switch means comprises at least one gas tube, said gas tube being responsive to voltage changes across said resistances in the case of open circuit conditions or short conditions to breakdown and conduct sufficient current to blow said fuse.

17. The combination of claim 15 wherein said impedance means comprises a plurality of resistances and said switch means comprises at least two gas tubes each said gas tube being connected in parallel across a portion of said resistances to respond to voltage changes across its respective portion of said resistances, breakdown of one of said tubes causes sufficient current flow to breakdown the other of said tubes whereby sufficient current is carried by said tubes to blow said fuse.

* * * * *